US011019560B2

(12) United States Patent
Likar et al.

(10) Patent No.: US 11,019,560 B2
(45) Date of Patent: May 25, 2021

(54) SELECTIVE CLOUD-BASED SSID (SERVICE SET IDENTIFIER) STEERING FOR ALLOWING DIFFERENT LEVELS OF ACCESS FOR WIRELESS NETWORK FRIENDS WHEN ONBOARDING ON WI-FI NETWORKS (71) Applicant: NEUTRINO8, INC., Santa Clara, CA (US)

(72) Inventors: Bojan Likar, Cupertino, CA (US); Ihab Abu-Hakima, Santa Clara, CA (US)

(73) Assignee: Neutrino8, Inc., Santa Clara, CA (US)

( * ) Notice: Subject to any disclaimer, the term of this patent is extended or adjusted under 35 U.S.C. 154(b) by 171 days.

(21) Appl. No.: 16/459,599

(22) Filed: Jul. 1, 2019

(65) Prior Publication Data
US 2020/0068483 A1 Feb. 27, 2020

Related U.S. Application Data (63) Continuation-in-part of application No. 15/391,790, filed on Dec. 27, 2016, now Pat. No. 10,390,217, and
(Continued)

(51) Int. Cl.
H04W 48/16 (2009.01)
H04W 12/06 (2021.01)
H04W 88/08 (2009.01)
H04W 76/11 (2018.01)
H04W 84/12 (2009.01)

(52) U.S. Cl.
CPC ........... *H04W 48/16* (2013.01); *H04W 12/06* (2013.01); *H04W 76/11* (2018.02); *H04W 88/08* (2013.01); *H04W 84/12* (2013.01)

(58) Field of Classification Search
CPC ....... H04W 8/22; H04W 76/15; H04W 84/20; H04W 76/02; H04W 72/08; H04W 76/10; H04W 72/085; H04W 24/02; H04W 12/04; H04W 12/02; H04W 8/26; H04W 16/32; H04W 36/18; H04W 36/08; H04W 36/14; H04W 84/12; H04W 36/055; H04W 16/16; H04W 36/22; H04W 48/16; H04W 76/11; H04W 12/06; H04W 88/08; G06F 13/40; G06F 13/00; G06F 13/102; G06F 13/4022; G06F 13/4081; G06F 1/1632; H04L 63/0428; H04L 9/16; H04L 9/08;
(Continued)

(56) References Cited

U.S. PATENT DOCUMENTS 9,143,400 B1 9/2015 Roskind
9,372,823 B1 6/2016 Cope
(Continued)

FOREIGN PATENT DOCUMENTS

WO WO-2015153924 A1 * 10/2015 .......... H04W 12/086

*Primary Examiner* — Hardikkumar D Patel
(74) *Attorney, Agent, or Firm* — Law Office of Dorian Cartwright; Dorian Cartwright (57) ABSTRACT A cloud-based onboarding server steers guest devices to a preferred SSID when detected as a guest of a homeowner access point also registered with the cloud-based onboarding server. Three different levels of network access include default, guest and private network access, and each network uses a different SSID from the homeowner access point.

4 Claims, 7 Drawing Sheets

Related U.S. Application Data a continuation-in-part of application No. 15/255,734, filed on Sep. 2, 2016.

(60) Provisional application No. 62/219,132, filed on Sep. 16, 2015.

(58) Field of Classification Search
CPC ....... H04L 9/0891; H04L 12/28; H04L 12/56; H04L 29/06; H04L 63/06
See application file for complete search history.

(56) References Cited

U.S. PATENT DOCUMENTS

| | | |
|---|---|---|
| 9,609,519 B2 | 3/2017 | Chen |
| 2009/0046644 A1 | 2/2009 | Krishnaswamy |
| 2012/0110640 A1* | 5/2012 | Donelson .............. H04L 63/102 726/3 |
| 2012/0110643 A1 | 5/2012 | Schmidt |
| 2013/0304879 A1 | 11/2013 | Schmidt |
| 2014/0073289 A1 | 3/2014 | Velasco |
| 2014/0092813 A1 | 4/2014 | Jaakkola |
| 2015/0071052 A1 | 3/2015 | Hershberg |
| 2015/0077231 A1 | 3/2015 | Kang |
| 2015/0078342 A1 | 3/2015 | Chen |
| 2015/0081837 A1 | 3/2015 | Bernier |
| 2016/0044720 A1 | 2/2016 | Boucher |
| 2016/0219631 A1 | 7/2016 | Chen |
| 2017/0007880 A1 | 1/2017 | Likar |
| 2017/0111173 A1 | 4/2017 | Sugitani |
| 2017/0134940 A1 | 5/2017 | Sharma |
| 2017/0135085 A1 | 5/2017 | Kaushik |
| 2017/0289885 A1 | 10/2017 | Kaushik |
| 2017/0300732 A1 | 10/2017 | Likar |

* cited by examiner

SELECTIVE CLOUD-BASED SSID (SERVICE SET IDENTIFIER) STEERING FOR ALLOWING DIFFERENT LEVELS OF ACCESS FOR WIRELESS NETWORK FRIENDS WHEN ONBOARDING ON WI-FI NETWORKS

CROSS-REFERENCE TO RELATED APPLICATIONS

This application is a continuation in part to U.S. application Ser. No. 15/255,734, filed Dec. 27, 2016, entitled CLOUD-BASED FRIEND ONBOARDING FOR WI-FI NETWORK COMMUNICATION AUTHENTICATION, by Bojan Likar, et al, which claims the benefit of priority to U.S. Provisional Application No. 62/219,132, filed Sep. 16, 2015, entitled CLOUD-BASED FRIEND ONBOARDING FOR WI-FI NETWORK COMMUNICATION AUTHENTICATION, by Bojan Likar, et al, which in turn claims the benefit of priority under 35 U.S.C. 120 to U.S. application Ser. No. 15/391,790, filed Dec. 27, 2016, entitled WIRELESS CONFIGURATION OF WIRELESS DISTRIBUTION SYSTEM (WDS) RANGE EXTENDERS USING NON-WI-FI WIRELESS COMMUNICATION CHANNELS, by Rajinder SINGH, which is commonly owned, the contents of each being hereby incorporated by reference in its entirety.

FIELD OF THE INVENTION

The invention relates generally to computer networking, and more specifically, to selective cloud-based SSID (service set identifier) when friends onboarding to a homeowner Wi-Fi network.

BACKGROUND

The mobility of computerized devices through Wi-Fi and other innovations has manifested more demand for increased mobility in computerized devices. To this end, ubiquitous networking would permit a wireless connection anytime, anywhere, and from any device. Unfortunately, the risk of malicious users and otherwise undesirable users hinders completely open networks. On the other hand, the inconvenience of security authentications, such as Wi-Fi credentials needed to log on to a local network in order to gain Internet access burdens benign users.

For example, when visiting the home of a friend, credentials are manually given transferred to the friend in order to gain Wi-Fi connectivity. The inconvenience of inputting credentials on a cell phone is made worse by the complex nature of credentials (e.g., use of caps and symbols). Further, an owner of the home needs to recall or find the credentials, and if the owner is not home at the time, it may be impossible to access the Wi-Fi network altogether.

Furthermore, visitors and friends to a network. are typically treated the same. But some friends need extra services or have a high level of trust and can have higher permission levels.

What is needed is a robust technique for cloud-based authentication of trusted users for onboarding to a Wi-Fi or other type of network. In some cases, selective cloud-based SSID when onboarding to a Wi-Fi network social networking connections can provide an assumed level of trust for automated onboarding techniques.

SUMMARY

The shortcomings of the prior art are addressed by methods, (non-transitory) computer program products, and systems for selective cloud-based SSID (service set identifier) steering authenticated users to preferred SSIDs when onboarding to a Wi-Fi network.

In one embodiment, a homeowner profile associated with a homeowner access point located remotely on a local access network and associated with a homeowner access point is authenticated. Similarly, a guest profile in coordination with an application executing on a guest device is also authenticated, the authentication using a telephone number associated with the device.

A request for access to the data communication network through the homeowner access point made from the guest device while within range of the access point is received. The request concerns access to the data communication network over Wi-Fi. A friends list for the homeowner user profile associated with the homeowner access point from a homeowner profile is retrieved. A network access level is indicated for each of the contacts on the friend list.

It is determined whether the guest profile is part of the friends list, and a network access level for the guest profile assigned by the homeowner profile. In one embodiment, an SSID of a plurality of SSIDs associated with the homeowner access point to the guest device, based on the network access level. The guest device is then steered to the assigned SSID by modifying the beacons to only be transmitted from the homeowner access point and to only include the assigned SSID to associate the homeowner access point with the guest device to provide access to the data communication network using the assigned SSID, the homeowner access point providing network services to the guest device as specified by parameters associated with the assigned SSIDs.

Advantageously, the communication network is improved with wider availability.

BRIEF DESCRIPTION OF THE DRAWINGS

In the following drawings, like reference numbers are used to refer to like elements. Although the following figures depict various examples of the invention, the invention is not limited to the examples depicted in the figures.

DETAILED DESCRIPTION

Methods, (non-transitory) computer program products, and systems for steering selective SSIDs to Wi-Fi guests when onboarding to a Wi-Fi network, as described herein.

The described techniques can apply to a homeowner allowing friends quick access to networking when visiting, with access levels to a Wi-Fi network controlled by the homeowner. Friends, as referred to herein, can take many different forms, aside from the literal form of two social buddies. A friendship between friends can be explicit, in that a network owner confirms the friendship in real-time over a mobile device or configures in advance. A friendship can also be implicit, in that connections are automatically identified on social networks or other commonalities.

Additionally, existing friendships can be direct connections, or less direct. For example, two followers of the same Twitter celebrity can be considered friends. Other forms of friends can include social networking friends, business associates, contacts through an address book, or inferred friends. Even a complete stranger (e.g., guest at a house party), in the literal sense, can be treated as a friend if confirmed by the network owner.

In various embodiments, different friends are steered to different SSIDs, dependent on a level of friendship. One of ordinary skill in the art will recognize variations to the disclosed embodiments that are contemplated, although no explicitly described. For instance, other type of networking devices bedsides Wi-Fi devices can be configured for friend onboarding (e.g., Bluetooth, audio, NFC, Zigbee or Z-Wave networks rather than or in conjunction with Wi-Fi networks).

Figure 2:
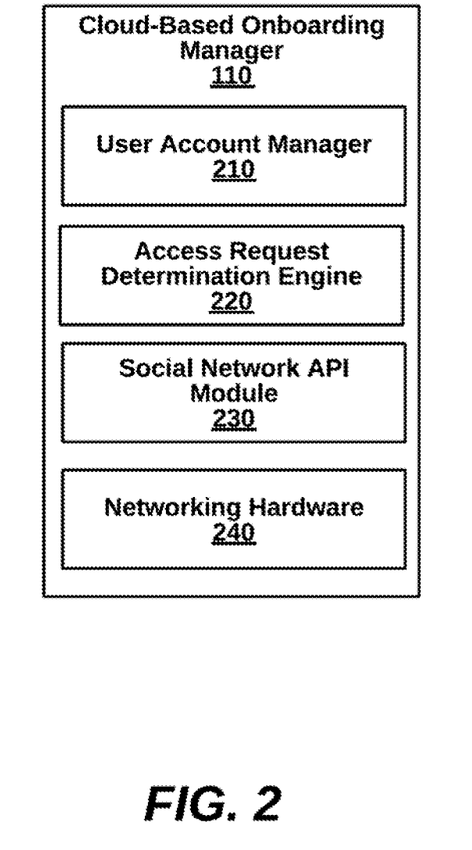
FIG. 2 is a more detailed block diagram illustrating a cloud-based Wi-Fi onboarding manager of FIG. 1, according to one embodiment.
Figure 3:
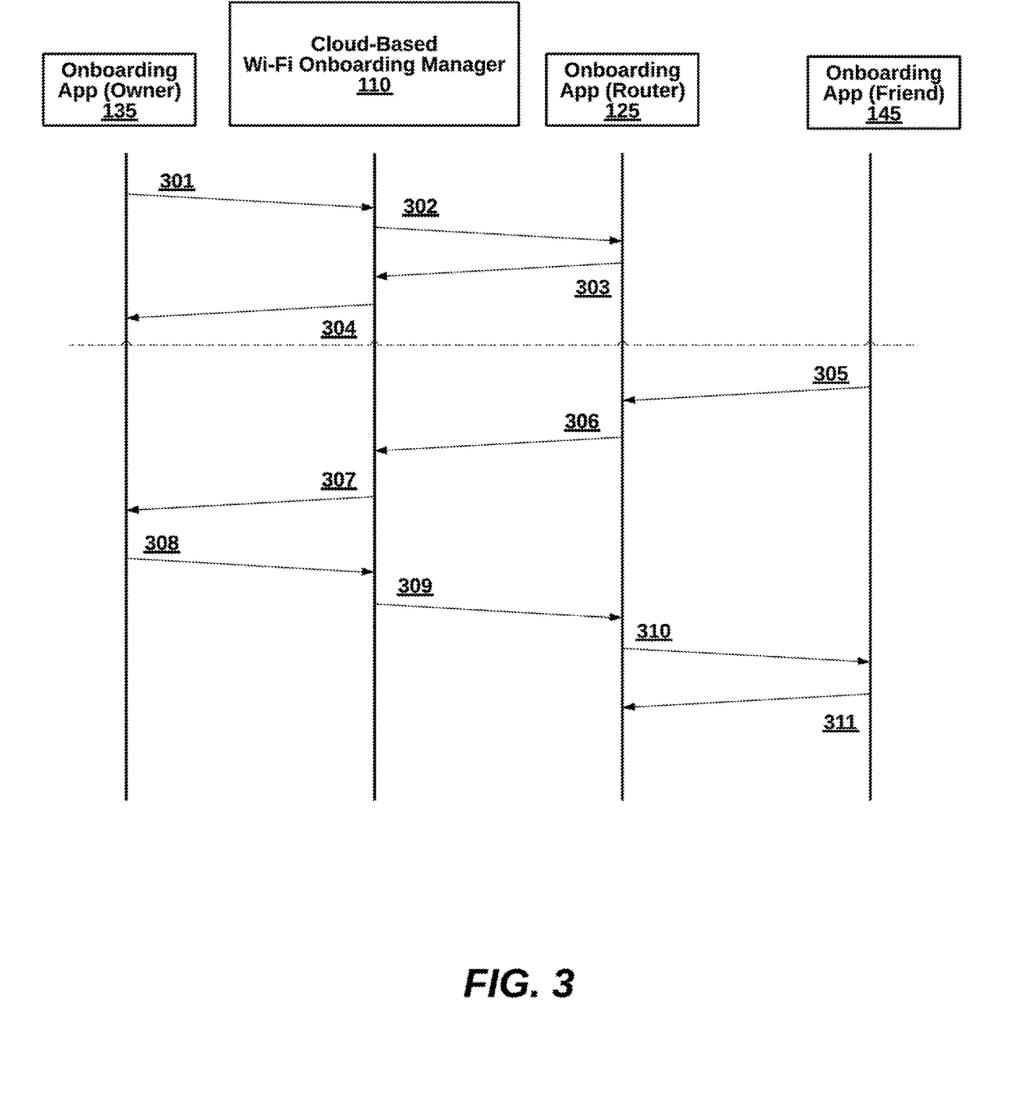
FIG. 3 is a sequence diagram illustrating interactions between components of the system in FIG. 1, according to one embodiment.

I. Systems for Friend Steering During Onboarding (FIGS. 1-3)

Figure 1:
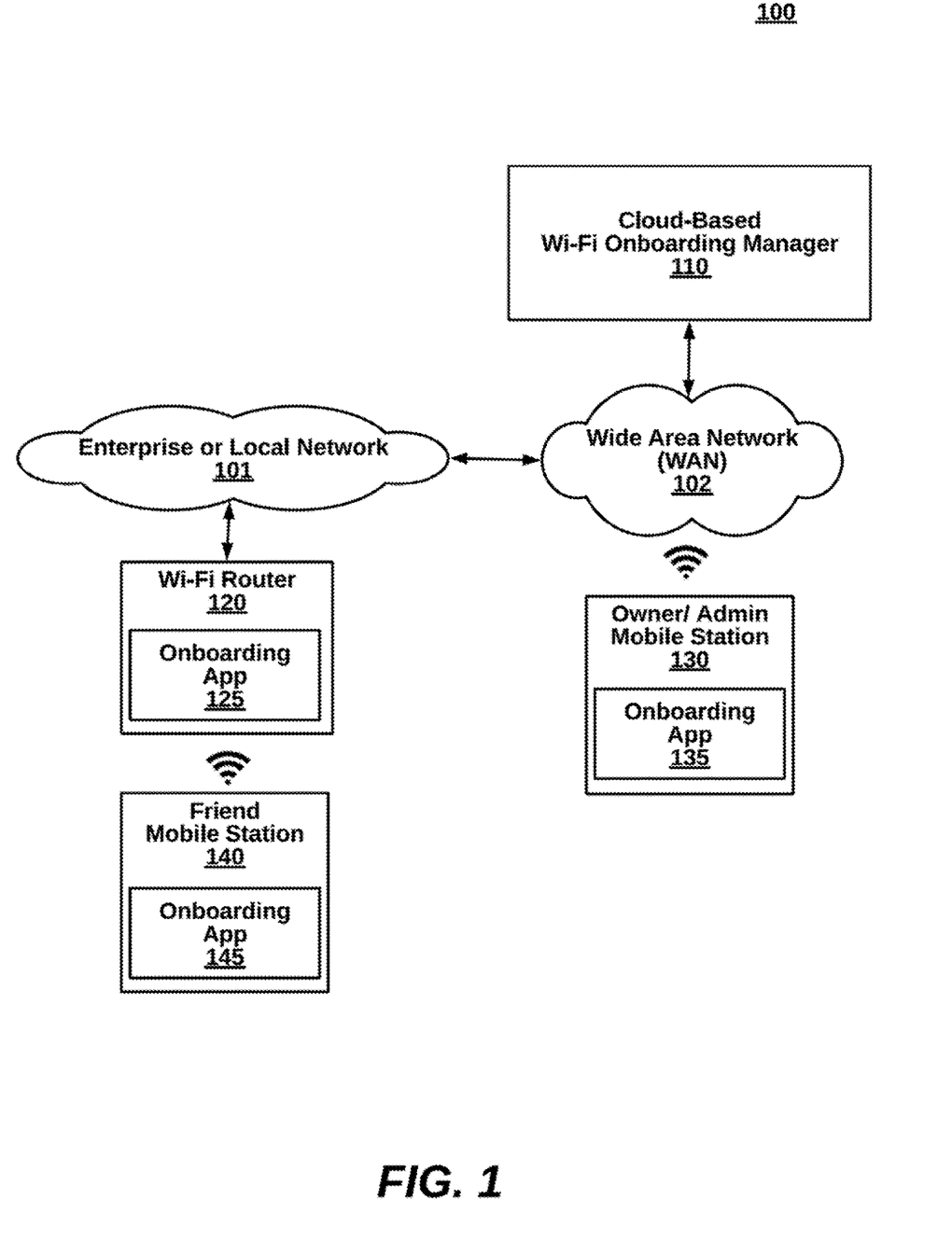
FIG. 1 is a high-level block diagram illustrating a cloud-based system for steering selective SSIDs to Wi-Fi guests when onboarding to a Wi-Fi network, according to one embodiment.

FIG. 1 is a high-level block diagram illustrating a system 100 for steering selective SSIDs to Wi-Fi guests when onboarding to a Wi-Fi network, according to one embodiment. The system 100 comprises a cloud-based Wi-Fi onboarding manager 110, a homeowner Wi-Fi router 120, a homeowner (or admin) mobile station 130 and a friend (or associate) mobile station 140. Additional network components can also be part of the system 100, such as firewalls, virus scanners, routers, switches, application servers, databases, as well as additional controllers, access points, access switches, stations, and the like. The network components can be implemented as hardware, software, or a combination of both. The system 100 can be implemented on a home network with a single router, a business with several different physical locations, or at hot spots, for instance.

The homeowner Wi-Fi router 120 can steer service to the friend mobile station 140 to a particular SSID. One SSID can be dedicated to the private network and another SSID can be dedicated to the guest network, in one instance. One example of an association process starts with detecting a request for access to a data communication network by the friend mobile station 140 and this can correspond to a buddy stopping by to visit homeowner. Rather than continue to use cellular data, the friend mobile station 140 detects Wi-Fi connections from beacons advertising available services. The homeowner Wi-Fi 120 can receive an association attempt in response to beacon advertisements. However, the homeowner Wi-Fi router 120 can work alone or in conjunction with other access points and routers to steer the friend mobile station 140 by only making a preferred SSID available for association. Once the association is complete, the Wi-Fi protocols utilize the preferred SSID for addressing network packets. The preferred SSID can correspond to the guest network.

The onboarding app 125 can be configured by an onboarding app 135 running at the owner mobile station 130, for example. The screenshots shown in FIGS. 6A-E shown an embodiment of a configuration sequence establishing a guest access to the guest network. In another embodiment, a configuration sequence establishes guest access to the private network. Some homeowners may choose to keep the private network completely private to the homeowner account. The snapshot of FIG. 1 shows the homeowner mobile station 130 having the highest level of access and quality of service by steering to the private SSID. The friend mobile station 140 has been configured for steering to the guest SSID as discussed in more detail above. Finally, the unknown mobile station 150 has been configured for steering to the global/default SSID.

In response to an attempt to connect by the friend mobile station 140, the homeowner Wi-Fi router determines whether a friendship exists between a network owner and the possible friend, the friend mobile station 140. In a first embodiment, an explicit friendship is determined by receiving real-time verification from a network owner (see FIGS. 6A-6E). In a second embodiment, an implicit friendship is determined by identifying a connection through a social network, a contacts list, or by inference. One example of an inferential friendship is based on geographical locations, friends in common, preferences, and other factors. More detailed embodiments of the homeowner Wi-Fi router 120 are described below with reference to FIG. 2.

The homeowner mobile station 130 is shown wirelessly connected to a wide area network (WAN) 102 (e.g., the Internet) which is connected to the enterprise network 101, but can also have a wired connection or connect directly to the enterprise network 101. Finally, the cloud-based Wi-Fi onboarding manager 110 can be an external component connected to the WAN 102 for access to the enterprise network 101.

More generally, the networks of the WAN 102 and the enterprise network 101, couple the components of the system 100 in communication for data transfers in the form of frames. Some components are preferably wired to the networks (e.g., cloud-based Wi-Fi onboarding manager 110, and Wi-Fi router 120). The friend mobile station 140 is wireless connects to the homeowner Wi-Fi router 120 on a Wi-Fi portion of the system 100. The networks 101, 102 can be a LAN, WAN, the Internet, a cloud-based network, a data network, a cellular network, a hybrid network, or the like.

The cloud-based Wi-Fi onboarding manager 110 steers visitors to different SSIDS representing different levels of network access and services. A global SSID can be assigned to all devices or to all devices authenticated t the cloud-based Wi-Fi onboarding manager 110. Although a guest device may be unknown to a LAN and homeowner Wi-Fi router 120, a guest user may be registered to the cloud-based Wi-Fi onboarding manager 110 for use at their own home, business, or school. Once recognized, a guest profile can be looked up for service as a visitor.

To do so, the cloud-based Wi-Fi onboarding manager 110 can create a user profile for an owner which may include social networking user profile data, preferences and settings. The cloud-based Wi-Fi onboarding manager 110 configures the homeowner Wi-Fi router 120 according to default settings and/or settings made by the owner. In response to notification of requested access by a mobile station, the cloud-based Wi-Fi onboarding manager 110 locates and notifies the owner mobile station 130 for an indication of whether or not to allow access, and in some cases, a level of access. In some embodiments, the cloud-based Wi-Fi onboarding manager 110 refers to a set of rules configured by the owner to automatically make determinations. The list of rules can include social networking authentication as described more fully below.

In one embodiment, the cloud-based Wi-Fi onboarding manager 110 comprises a standard server device executing software. The cloud-based Wi-Fi onboarding manager 110 can be one device, a group of distributed devices, or a virtualized device. The cloud-based Wi-Fi onboarding manager 110 can be operated by a service provider to many different owners having user profiles. Alternatively, the cloud-based Wi-Fi onboarding manager 110 can be owned by an enterprise and deployed directly on the enterprise network 101.

The homeowner Wi-Fi router 120 responds to access requests according to direction from the cloud-based Wi-Fi onboarding manager 110. In more detail, the homeowner Wi-Fi router 120 uses beacons to advertise one or more SSIDs available to mobile stations desiring access to the WAN 102 or just to the enterprise network 101. Mobile stations such as the friend mobile station 140 associated with the homeowner Wi-Fi router 120 using, for example, an open SSID configuration but are not allowed to reach the WAN 102 nor LAN 101. The cloud-based Wi-Fi onboarding manager 110 is contacted for authorization. Once the owner has authorized access, the friend mobile station 120 can be transferred to a secure SSID (Service Set Identifier) before and then given Internet access. In one embodiment, an authentication denial by the owner is followed with a standard request for credentials from the Wi-Fi router 120.

In an embodiment, the homeowner Wi-Fi router 120 comprises a home networking router by Netgear, Linksys or as provided by an ISP (Internet Service Provider). In another embodiment, the homeowner Wi-Fi router 120 comprises a commercial grade access point. In still other embodiments, the mobile stations indirectly connect to the homeowner Wi-Fi router 120 and first connect to a repeater or other peripheral device in a mesh network. One implementation of the homeowner Wi-Fi router 120 includes an onboarding app 125 to implement processes of the manager 110. To provide network service, in one embodiment, the homeowner Wi-Fi router 120 complies with IEEE 802.11 protocols (promulgated by the Institute of Electrical and Electronics Engineers). Under IEEE 802.11, a beacon with one or more BSSIDs is periodically sent to advertise a presence for new connections and maintain current connections. Then the homeowner Wi-Fi router 120 listens for packets addressed to associated BSSIDs and ignores packets addressed to unassociated BSSIDs. Furthermore, the homeowner Wi-Fi router 120 forwards packets addressed to MAC (Media Access Control) addresses of associated stations.

The homeowner mobile station 130 is utilized by an owner or a network administrator to configure the cloud-based Wi-Fi onboarding manager 110 and provide authorization requests in real-time or otherwise. Although homeowner and homeowner mobile station are utilized as an example throughout, many other embodiments are possible, such as a business owner, a store owner, an apartment tenant, a home room school teacher, a coffee shop, a library, a sports venue, and the like. Specifically, in one embodiment, the homeowner mobile station 130 sets up a user profile which includes security information necessary to connect mobile stations to the homeowner Wi-Fi router 120. When a friend comes within range of the homeowner Wi-Fi router 120, a request for authorization can pop up on the homeowner mobile station 130. In some instances, the owner merely selects yes or no. Identification information concerning the friend can also be provided, for example, through the cloud-based Wi-Fi onboarding manager 110 pre-configurations, social networking data, EAP-SIM authentication, or by contacts stored locally. The owner can permit network access, deny network access, or set access limitations (e.g., limited duration, limited data rate or data volume, one-time access, unlimited access, or access under parental controls).

An embodiment of the owner mobile station 130 can be a smartphone (e.g., including iOS or Android operating system), a tablet or phablet device, a laptop device, or the like. The owner mobile station 130 can further comprise an onboarding app 135. Although mobile stations are contemplated for the maximum benefit of the system 100, an owner can also administer the system from a stationary device such as a PC. Furthermore, rather than being remote, an owner can be in the same room as a friend needing Internet access.

The friend mobile station 140 is automatically authorized for access to the WAN 102 when connecting to the Wi-Fi router 120. In some cases, a friend selects a nearby Wi-Fi network to join in order to reach a web page or other external data. The back end authentication process can be invisible to the friend, or a pop up can indicate that external processes are in action. The friend mobile station 140 can comprise a smartphone or other mobile device or stationary device described herein. Also, the friend mobile station 140 can comprise an onboarding app 145.

Generally, with respect to the onboarding apps 125, 135, 145, many variations are possible, such mobile apps, streaming apps, desktop applications, and daemons. Preferably, an app is downloaded and installed to a device and can be updated as needed. The functions can be implemented in software, hardware, or a combination of both. Over time, some functionality may become integrated with operating systems, browsers, other apps, and the like, such that no app is needed or functionality is spread among the app and other software and hardware components. In this case, the onboarding apps 125, 135, 145 are intended to represent a collection of distributed functionality rather than a single physical implementation of functionality.

In one optional embodiment, authentication is automated or enhanced through social networking connections or between owners and friends. For example, if users are friends on Facebook or connected via LinkedIn, as determined by the system 100, network access can be granted without any human interaction. In more detail, an owner and a friend can register with the system using Facebook credentials. Those same credentials are used to determine a friend connection between the parties. Because Facebook friends are assumed by the system to have a threshold level of trust, network security credentials can be provided by the manager 110. In one embodiment, the cloud-based Wi-Fi onboarding manager 110 can make a network access request to an owner through social networking APIs (e.g., send a Twitter message or Facebook private message).

Other social networking platforms examples include Google Circles, Instagram, Snapchat, Google Hangouts, Pinterest, Twitter, and the like. Some embodiments can be extended to friends of friends or other indirect associations. Other systems of trust can include Gmail sender or receiver of email, SMS sender or receiver or text messages, local contacts, phone numbers dialed or received, and the like.

FIG. 2 is a more detailed block diagram illustrating the cloud-based Wi-Fi onboarding manager 110 of FIG. 1, according to one embodiment. The cloud-based Wi-Fi onboarding manager 110 of this embodiment includes a user account manager 210, access request determination engine 220, social network API module 230, and networking hardware 240.

The user account manager 210 preconfigures a user policy for friend onboarding by selecting whether access to the guest network or to the private network should be granted. In one embodiment, the user account is accessed through a user interface executing on a browser or an independent application. A network owner can access settings of the account. Although the description refers to a network owner throughout, this is non-limiting as other actors can include a network administrator, a homeowner, an Internet customer, a hot spot operator, and the like.

The access request determination engine 220 responds to real-time access requests. In one embodiment, the access request determination engine 220 stores a list of friends and corresponding network access permissions. If a friendship can be confirmed by the access request determination engine 220, the access request may be granted. On the other hand, the access request may be denied upon failure to confirm any friendship.

The social network API module 230 connects to social networks in order to identify friendships. In one implementation, a user configures a user account with a friend onboarding policy. On the other hand, a friend onboarding policy can be default, dynamically updated, or the like. The onboarding policy can include credentials for specific networks. By presenting the credentials, the social network API 230 can log on to the network and search a friend list to confirm friendships. For example, Facebook friends, Twitter followers, LinkedIn associates, or neighbors can be verified.

The networking hardware 240 can comprise networking interface components such as Wi-Fi radios, Wi-Fi antennae, transceivers, coders and decoders, digital signal processors, and other supporting lower level hardware and processes necessary for communication across channels. The networking hardware 240 can support different variations of IEEE 802.11, including multiple input/multiple output (MIMO) and other techniques.

FIG. 3 is a sequence diagram illustrating interactions between components of the system in FIG. 1, according to one embodiment. The specific interactions shown in FIG. 3 and described below can be performed in different orders, can include many sub-interactions, and still be contemplated by the present disclosure. Moreover, the methods below of FIG. 4 describe processes that are internal to the components, as opposed to the external messages exchanged in FIG. 3.

An owner utilizing onboard app 135 at the owner mobile station 130 pre-configures onboarding by registering with the manager 210 (interaction 301) which in turn registers with the onboard app 125 at the Wi-Fi router 130 (interaction 302). Confirmations are returned upstream (interactions 303, 304).

At some later point in time, a friend attempts network access from onboarding app 145 at the friend mobile station 140 (interaction 305). The onboard app 125, in response, checks with the cloud-based Wi-Fi onboarding manager 110 (interaction 306) for approval by the owner (interaction 307). The owner response is sent back downstream (interactions 308, 309, 310). If permitted, the friend can then use the homeowner Wi-Fi router 120 for network access or to enter credentials. If not permitted, the fried is denied access (interaction 311). Furthermore, access is controlled by steering the friend to a particular SSID.

III. Methods for Friend Steering During Onboarding Authentication

Figure 4:
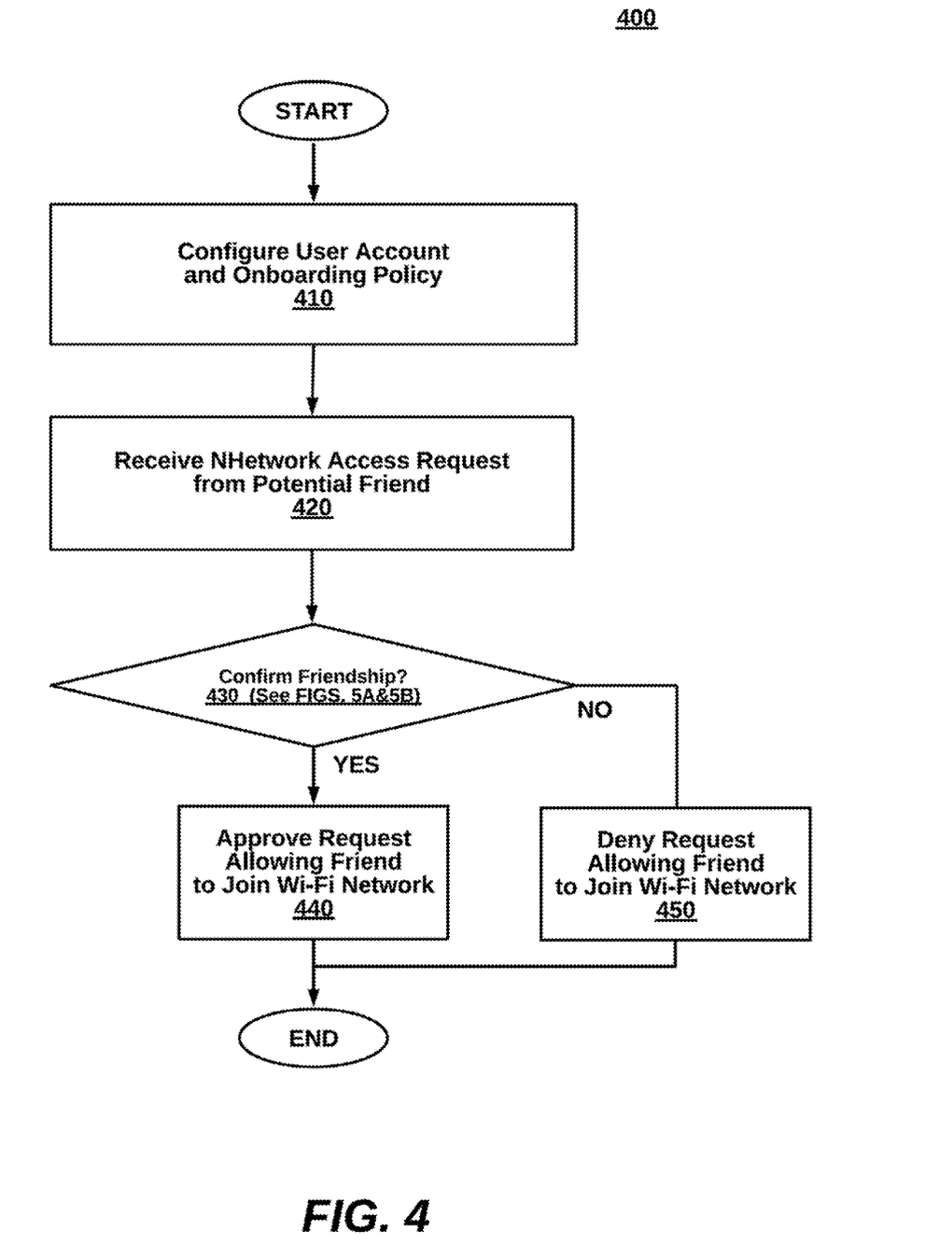
FIG. 4 is a high-level flow chart illustrating a method for a cloud-based steering selective SSIDs to Wi-Fi guests when onboarding to a Wi-Fi network, according to one embodiment.

FIG. 4 is a block diagram illustrating a method 400 for selective cloud-based SSID when onboarding to a Wi-Fi network, according to one embodiment.

A homeowner access point is authenticated with a cloud-based Wi-Fi onboarding server (step 410). Guest profiles and guest mobile devices are authenticated using phone numbers (step 420). In one example, a code is delivered to the phone number via SMS for authentication. In another example, a SIM card or MAC address serves as an identifier for authentication. Guest devices are steered to preferred SSIDs in managing a level of network access to friend within range of the local Wi-Fi network (step 430).

Figure 5A:
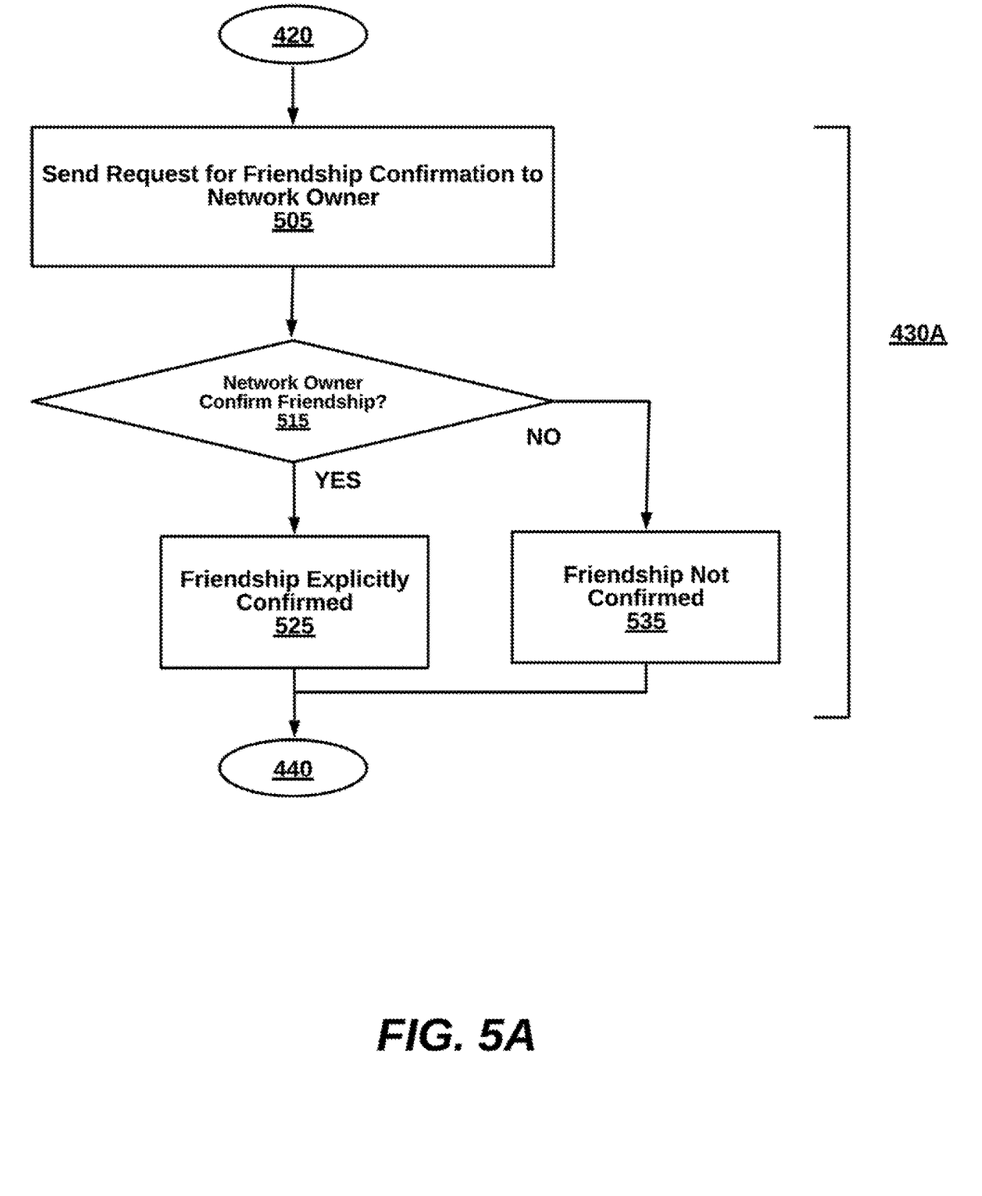
FIGS. 5A-5B are flow charts illustrating the confirmation step of the method of FIG. 4, as an explicit confirmation of friendship, and an implicit confirmation of friendship, according to some embodiments.

To this end, one example embodiment of step 430A is set forth in FIG. 5A. When a request for access is received from a guest at a homeowner router, the guest and friendship is examined for network assignments (step 505). If a friendship is confirmed, the guest device is steered to an SSID for a guest Wi-Fi network (step 525), and if not confirmed, the guest device is steered to a default SSID (step 535). In some embodiments, cloud-authentication is required even for default access. Friendship authentication, thus, can elevate the default access level. For instance, a time of access can be increased as shown in FIG. 5E.

Figure 5B:
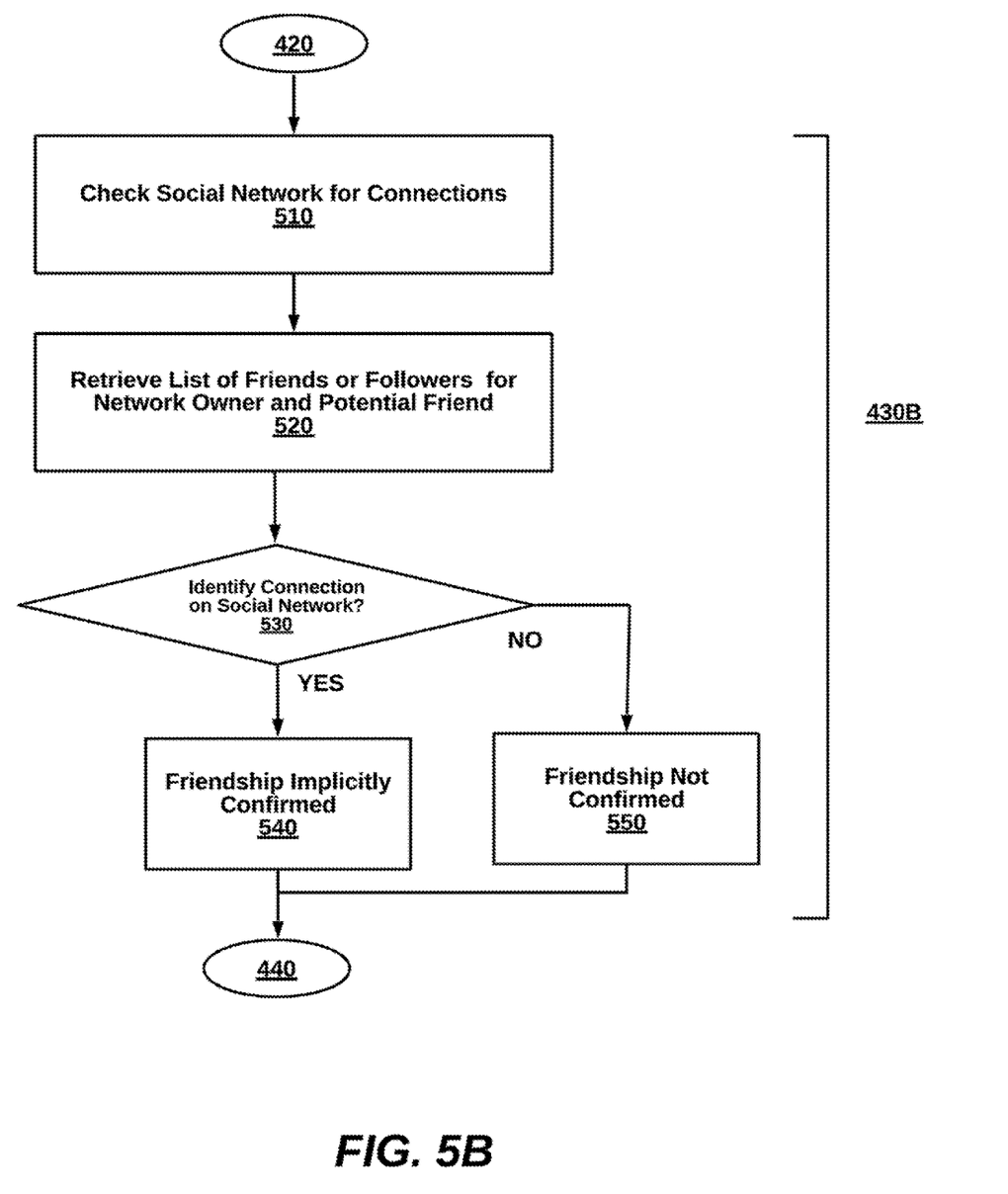

Friendship authentication is shown, in another example embodiment of step 430B, is illustrated in FIG. 5B. First, an explicit friendship match is checked by searching a preconfigured list of contacts (step 510). In another embodiment, a homeowner as automatically reached in real-time for confirmation of a particular guest. Next, an implicit friendship is checked by checking social networks for friends, followers and other connections (step 540). If an implicit connection is identified (step 530), the friendship of guest is confirmed (step 540) for higher network access level. There may also be no friendship of the guest confirmed (step 550) leading to a default access level, or no access at all. Many other variations of explicit and implicit confirmation are possible.

IV. Generic Computing Device (FIG. 6)

Figure 6:
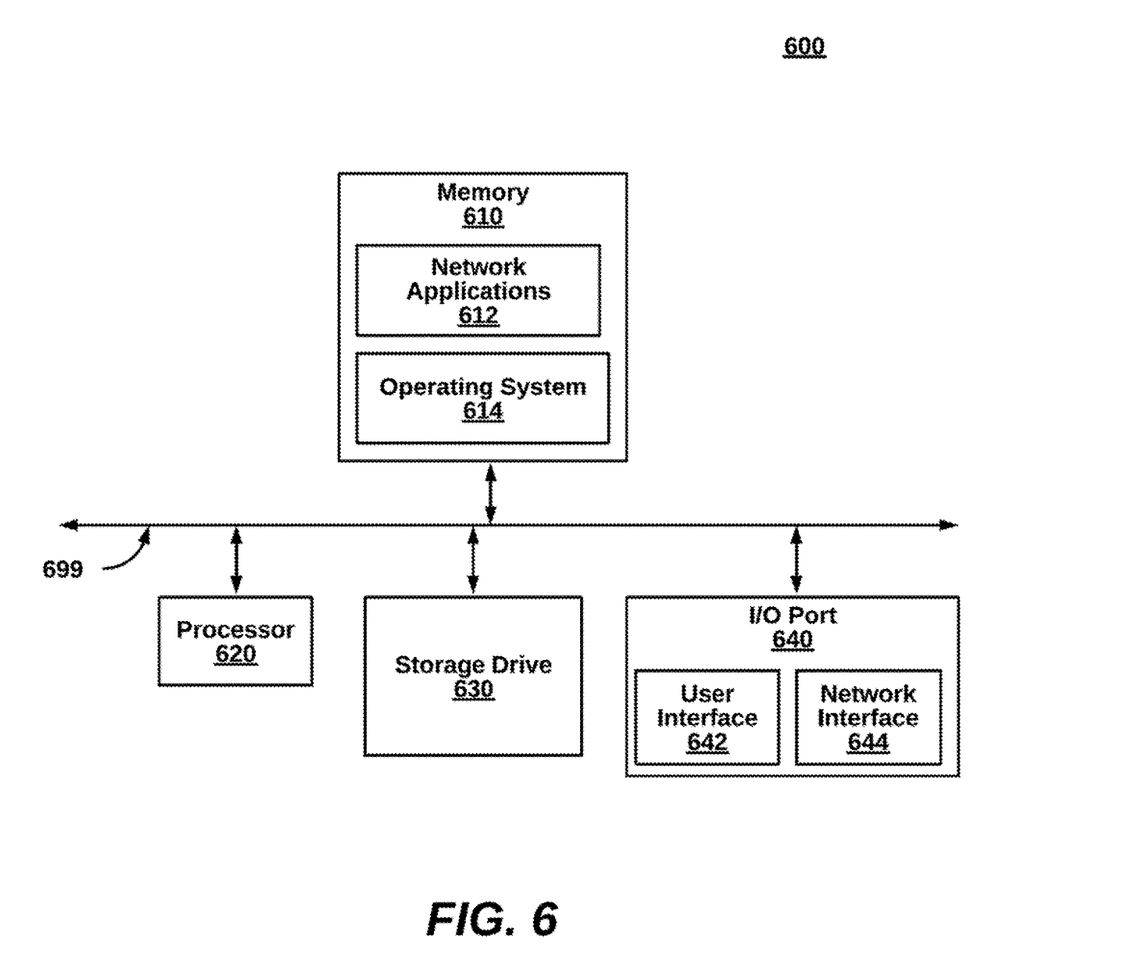
FIG. 6 is a block diagram illustrating an exemplary computing device for implementing the techniques described herein, according to one embodiment.

FIG. 6 is a block diagram illustrating an exemplary computing device 600 for use in the system 100 of FIG. 1, according to one embodiment. The computing device 600 is an exemplary device that is implementable for each of the components of the system 100, including the cloud-based Wi-Fi onboarding manager 110, the homeowner Wi-Fi router 120, and the mobile stations (130, 140, 150). The computing device 600 can be a mobile computing device, a laptop device, a smartphone, a tablet device, a phablet device, a video game console, a personal computing device, a stationary computing device, a server blade, an Internet appliance, a virtual computing device, a distributed computing device, a cloud-based computing device, or any appropriate processor-driven device.

The computing device 600, of the present embodiment, includes a memory 610, a processor 620, a storage drive 630, and an I/O port 640. Each of the components is coupled for electronic communication via a bus 699. Communication can be digital and/or analog, and use any suitable protocol.

The memory 610 further comprises network applications 612 and an operating system 614. The network applications 612 can include the modules of the components illustrated in FIG. 1. Other network applications 612 can include a web browser, a mobile application, an application that uses networking, a remote application executing locally, a network protocol application, a network management application, a network routing application, or the like.

The operating system 614 can be one of the Microsoft Windows® family of operating systems (e.g., Windows 95, 98, Me, Windows NT, Windows 2000, Windows XP, Windows XP x64 Edition, Windows Vista, Windows CE, Windows Mobile, Windows 8 or Windows 10), Linux, HP-UX, UNIX, Sun OS, Solaris, Mac OS X, Alpha OS, AIX, IRIX32, or IRIX64. Other operating systems may be used. Microsoft Windows is a trademark of Microsoft Corporation.

The processor 620 can be a network processor (e.g., optimized for IEEE 802.11), a general-purpose processor, an application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 620 can be single core, multiple core, or include more than one processing elements. The processor 620 can be disposed on silicon or any other suitable material. The processor 620 can receive and execute instructions and data stored in the memory 610 or the storage drive 630.

The storage drive 630 can be any non-volatile type of storage such as a magnetic disc, EEPROM, Flash, or the like. The storage drive 630 stores code and data for applications.

The I/O port 640 further comprises a user interface 642 and a network interface 644. The user interface 642 can output to a display device and receive input from, for example, a keyboard. The network interface 644 (e.g. RF antennae) connects to a medium such as Ethernet or Wi-Fi for data input and output.

Many of the functionalities described herein can be implemented with computer software, computer hardware, or a combination.

Computer software products (e.g., non-transitory computer products storing source code) may be written in any of various suitable programming languages, such as C, C++, C#, Oracle® Java, JavaScript, PHP, Python, Perl, Ruby, AJAX, and Adobe® Flash®. The computer software product may be an independent application with data input and data display modules. Alternatively, the computer software products may be classes that are instantiated as distributed objects. The computer software products may also be component software such as Java Beans (from Sun Microsystems) or Enterprise Java Beans (EJB from Sun Microsystems).

Furthermore, the computer that is running the previously mentioned computer software may be connected to a network and may interface to other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.11ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

IV. Additional Embodiments

Generally, one of ordinary skill in the art will recognize that the examples set forth herein are non-limiting and only illustrative of widely-applicable principles. Accordingly, this description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

We claim:

1. A computer-implemented method in a cloud-based Wi-Fi onboarding server device of a data communication system, implemented at least partially in hardware, for selective cloud-based SSID (Service Set Identifier) steering of Wi-Fi guests when onboarding to Wi-Fi networks of friends, the method comprising the steps of:
    authenticating, at a processor of the onboarding server device, a homeowner profile associated with a homeowner access point located remotely on a local access network and associated with a homeowner access point;
    authenticating, a guest profile in coordination with an application executing on a guest device, the authentication using a telephone number associated with the device;
    receiving, at a network interface of the onboarding server device coupled to the data communication network, a request for access to the data communication network through the homeowner access point made from the guest device while within range of the access point, the request concerning access to the data communication network over Wi-Fi;
    identifying a friends list for the homeowner user profile associated with the homeowner access point from a homeowner profile, wherein a network access level is indicated for each of the contacts on the friend list;
    determining whether the guest profile is part of the friends list, and a network access level for the guest profile assigned by the homeowner profile;
    assigning an SSID of a plurality of SSIDs associated with the homeowner access point to the guest device, based on the network access level;
    steering the guest device to the assigned SSID by modifying the beacons to only be transmitted from the homeowner access point and to only include the assigned SSID to associate the homeowner access point with the guest device to provide access to the data communication network using the assigned SSID, the homeowner access point providing network services to the guest device as specified by parameters associated with the assigned SSID.

2. The method of claim 1, wherein the cloud-based Wi-Fi onboarding server device authenticates a plurality of homeowner user profiles to manage visitors.

3. The method of claim 1, wherein the cloud-based Wi-Fi onboarding server device authenticates a plurality of guest profiles during visits.

4. A non-transitory computer-readable media comprising source code, that, when executed by a processor, performs a method in a cloud-based Wi-Fi onboarding server device of a data communication system, implemented at least partially in hardware, for selective cloud-based SSID (Service Set Identifier) steering of Wi-Fi guests when onboarding to Wi-Fi networks of friends, the method comprising the steps of:

authenticating, at the processor of the onboarding server device, a homeowner profile associated with a homeowner access point located remotely on a local access network and associated with a homeowner access point;

authenticating, a guest profile in coordination with an application executing on a guest device, the authentication using a telephone number associated with the device;

receiving, at a network interface of the onboarding server device coupled to the data communication network, a request for access to the data communication network through the homeowner access point made from the guest device while within range of the access point, the request concerning access to the data communication network over Wi-Fi;

identifying a friends list for the homeowner user profile associated with the homeowner access point from a homeowner profile, wherein a network access level is indicated for each of the contacts on the friend list;

determining whether the guest profile is part of the friends list, and a network access level for the guest profile assigned by the homeowner profile;

assigning an SSID of a plurality of SSIDs associated with the homeowner access point to the guest device, based on the network access level;

steering the guest device to the assigned SSID by modifying the beacons to only be transmitted from the homeowner access point and to only include the assigned SSID to associate the homeowner access point with the guest device to provide access to the data communication network using the assigned SSID, the homeowner access point providing network services to the guest device as specified by parameters associated with the assigned SSID.

\* \* \* \* \*